B. STOMBERG.
SHOCK ABSORBER.
APPLICATION FILED APR. 3, 1917.
1,237,117.
Patented Aug. 14, 1917.
2 SHEETS—SHEET 1.
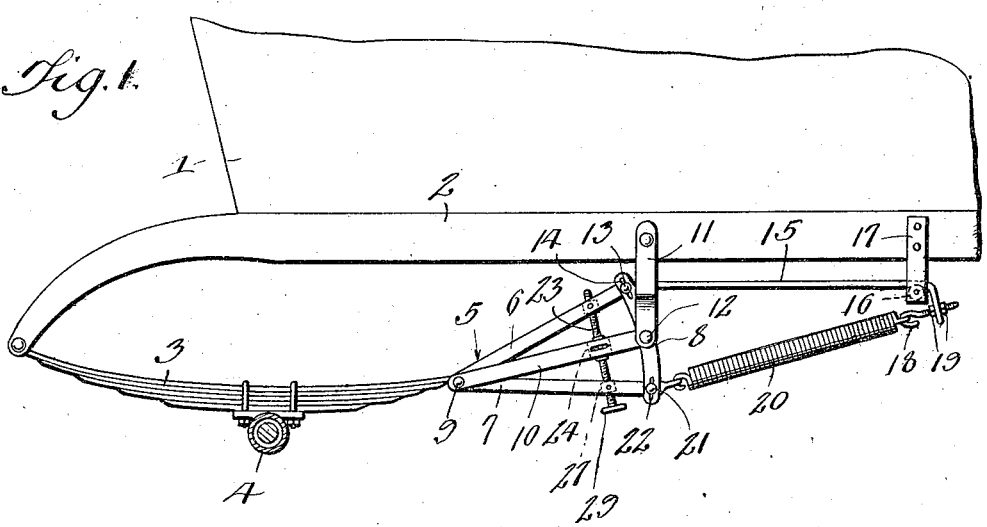
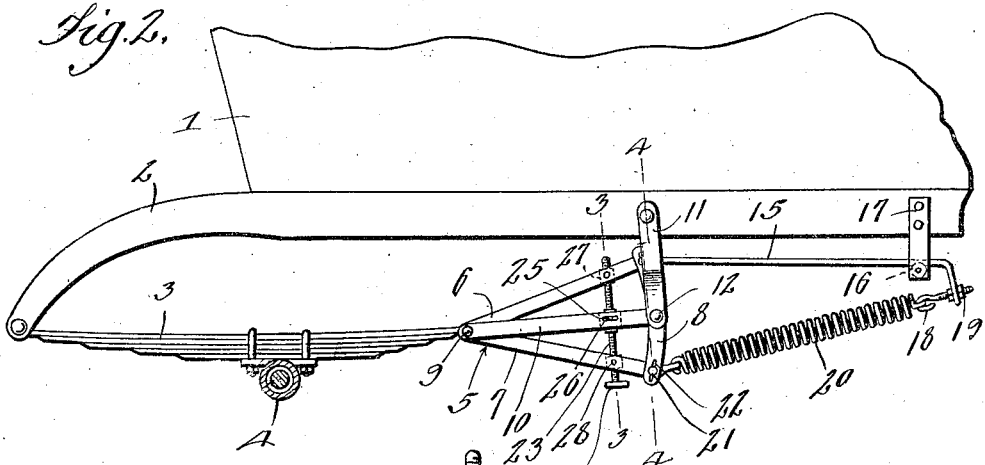
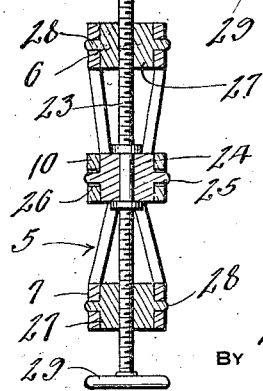
WITNESSES
INVENTOR
B. Stomberg,
BY Victor J. Evans
ATTORNEY

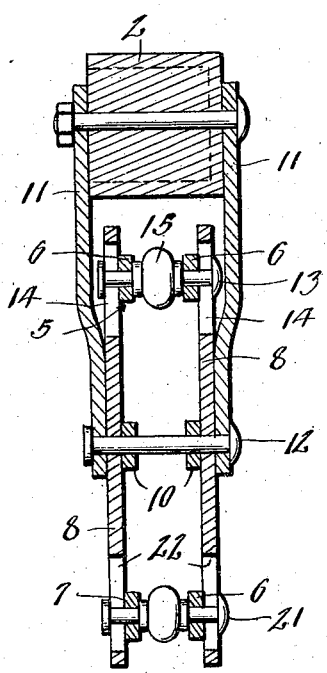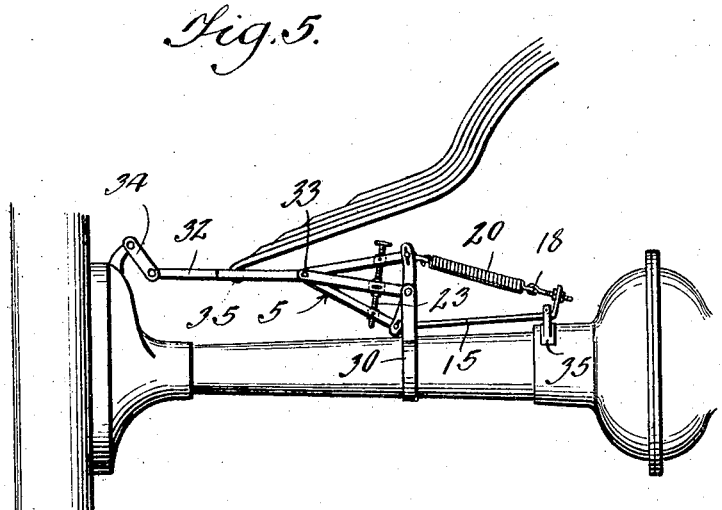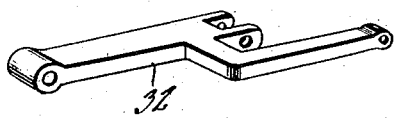

UNITED STATES PATENT OFFICE.

BEN STOMBERG, OF ELIZABETH, MINNESOTA.

SHOCK-ABSORBER.

1,237,117.  Specification of Letters Patent.  Patented Aug. 14, 1917.

Application filed April 3, 1917. Serial No. 159,519.

*To all whom it may concern:*

Be it known that I, BEN STOMBERG, a citizen of the United States, residing at Elizabeth, in the county of Ottertail and State of Minnesota, have invented new and useful Improvements in Shock-Absorbers, of which the following is a specification.

This invention comprehends improvements in shock absorbers for vehicles and relates particularly to adjustable shock absorbing means adapted to be connected to the springs of a vehicle and the body or frame to cushion a load.

One of the objects of the invention is to provide a shock absorber for automobiles which may be interposed between the standard springs of the machine and the frame or axles to cushion the load and which may be adjusted to all road conditions and to various loads.

The invention also aims to generally improve cushioning devices of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a perspective view showing my invention as applied to a vehicle.

Fig. 2 is a side elevation showing the shock absorber when under load.

Fig. 3 is a sectional view on the plane of line 3—3 of Fig. 2.

Fig. 4 is a vertical section on the plane of line 4—4 of Fig. 2.

Fig. 5 is a side elevation showing the application of the shock absorber to a vehicle having transverse springs, and Fig. 6 is a detail view of a part to be hereinafter described.

Referring in detail to the drawings by numerals, 1 designates the body of the vehicle, 2 a frame bar of common design and 3 a leaf spring of semi-elliptic form connected at its rear end to the frame bar in the usual manner. The spring 3 is connected intermediate its end to the axle 4 and is secured at its forward end to my shock absorber or cushioning means.

The shock absorber comprises a segmental frame 5 having side members 6 and 7 and an arcuate base member 8. The sides and base of the frame are formed by spaced bars and the side bars overlap at their rear ends and are secured to the spring 3 by a pivot bolt 9. A central longitudinal brace member 10 formed of two spaced parallel bars is rigidly connected to the base member 8 of the frame and pivotally connected to the side members 6 and 7 by the pivot bolt 9.

A pair of hangers 11 are pivotally connected to the frame bar 2 of the vehicle by any suitable fastening means and are pivotally connected at their lower ends to the center of the base member 8 of the frame 5 by a pivot bolt 12.

The bars of the side members 6 of the frame 5 are connected to the bars of the frame member 8 by a pivot bolt 13 which may move laterally within slots 14 in the bars of the member 8. This bolt 13 passes through the rod 15 connecting the rod to the frame 5. The rod extends forwardly over a roller 16 in a guide hanger 17 secured to the frame bar 2. The forward end of the bar 15 is extended downwardly and formed with a transverse opening through which extends a hook 18 having a threaded shank engaged with a nut 19. A contractile helical spring 20 is secured at one end to the hook 18 and at its other end to a pivot bolt 21 which works through slots 22 in the bars of the frame member 8 and connects the frame member 7 thereto.

As the vehicle spring 3 vibrates because of changing load conditions, the frame 5 will rock on its pivot 12 causing the spring to expand and contract. The spring 20 coöperates with the spring 3 to cushion the load.

This spring 20 may be adjusted by an adjustment of the hook 18 and to provide for further adjustment of the absorber I employ a means for adjusting the positions of the pivot bolts 13 and 21. This means includes a rod 23 swiveled through a block 24 slidably mounted between the bars of the brace member 10 by means of trunnions 25 which work within slots 26. The rod 23 is threaded in opposite directions upon opposite sides of the central portion and the threaded sections extend through nuts or blocks 27 rotatably secured between the bars of the frame members 6 and 7 by trunnions 28. When the rod 23 is rotated in one direction, it will draw the side members of the frame together and when rotated in the other direction will spread these members. The bar may be formed on one end with a wrench engaging face 29.

When the load is light, the pivot bolts 13 and 21 may be moved toward each other to decrease the leverage or pull exerted on the spring 20 and when the load is heavy, the pivot fasteners will be spread apart to increase the pull on the spring.

In Fig. 5, I have shown the application of my shock absorber to a vehicle having the springs disposed transversely of the body. Here, the frame 5 is pivoted to a stationary support 30 fixed to the axle 31. The outer end of the segmental frame is pivotally and slidably connected to the bar 32 by a pivot bolt fastened through a slot 33 in the inner end of this bar. The outer end of the bar is pivotally connected to a bracket 34 carried by the axle. The vehicle spring is connected by a toggle to the bar 32 intermediate its ends as indicated at 35. A guide 36 secured to the axle encircles the rod 15 of the shock absorber and holds it in proper operative position.

It will be understood that my improved shock absorbing means may be connected to both the front and rear springs of a vehicle but I do not wish to be limited to the exact construction herein shown and described, but will make such changes as will fall within the scope and spirit of the invention as claimed.

What I claim is:—

1. In combination with a vehicle body and running gear therefor, a shock absorber comprising a frame mounted for rocking movement when the relative positions of the body and running gear are changed, a rod connected to said frame and movable longitudinally and a spring connected to said rod and to said frame, said spring tending to hold the frame against rocking movement in one direction.

2. In combination with a vehicle body and running gear, a spring connected to said running gear and to the vehicle body, a shock absorber comprising a frame mounted on the vehicle body for rocking movement, said frame being pivotally connected to the spring, a rod pivotally connected to the frame and movable longitudinally, and a second spring connected to the frame and to said rod, the second mentioned spring serving to retard the movement of the frame in one direction.

3. In combination with a vehicle body and running gear, a spring secured at one end to the vehicle body and intermediate its ends to the running gear, a segmental frame pivotally connected to the other end of said spring and pivotally connected for rocking movement to the body, a rod connected to the frame and movable longitudinally, a spring connected to said frame and to the rod and means for adjusting the tension of the spring, said spring tending to retard the movement of the frame in one direction.

4. In combination with a vehicle body and running gear, a spring secured at one end to the vehicle body and intermediate its ends to the running gear, a segmental frame having converging side members and a base member, means pivotally connecting the side members at their point of convergency to the other end of said spring, means pivotally connecting the frame intermediate its base member to the vehicle body, a rod connected to the base member adjacent one end and movable longitudinally, a spring connected to the base member adjacent its other end and to said rod, and means for adjusting the tension of said spring.

5. In combination with a vehicle body and running gear, a spring secured at one end to the vehicle body and intermediate its ends to the running gear, a frame having converging side members and a base member, means pivotally connecting the side members of the frame at their point of convergency to said spring, means pivotally connecting the base member of the frame intermediate its ends to said body, a rod connected to the base member of the frame and movable longitudinally, a spring connected to the base member of the frame and to said rod, the rod and spring being connected with the base member on opposite sides of its pivot point and means for moving the points of connection of the spring and rod with the base member toward and away from the pivot point of the base member, said spring coacting between the first mentioned spring and the body of the vehicle.

In testimony whereof I affix my signature.

BEN STOMBERG.

Copies of this patent may be obtained for five cents each, by addressing the "Commissioner of Patents, Washington, D. C."